(12) United States Patent
Taga et al.

(10) Patent No.: US 8,252,102 B2
(45) Date of Patent: Aug. 28, 2012

(54) WATER-BASED BLACK INK FOR INK-JET RECORDING, INK CARTRIDGE, AND INK-JET RECORDING APPARATUS

(75) Inventors: Yasuhiro Taga, Nagoya (JP); Kazuma Goto, Nagoya (JP); Narumi Koga, Nagoya (JP)

(73) Assignee: Brother Kogyo Kabushiki Kaisha, Nagoys-shi, Aichi (JP)

( * ) Notice: Subject to any disclaimer, the term of this patent is extended or adjusted under 35 U.S.C. 154(b) by 382 days.

(21) Appl. No.: 12/604,456

(22) Filed: Oct. 23, 2009

(65) Prior Publication Data

US 2010/0101450 A1  Apr. 29, 2010

(30) Foreign Application Priority Data

Oct. 24, 2008 (JP) .................. 2008-273888

(51) Int. Cl.
*C09D 11/02* (2006.01)
(52) U.S. Cl. .................. 106/31.48; 106/31.49
(58) Field of Classification Search ......... 106/31.48, 106/31.49; 347/86, 100
See application file for complete search history.

(56) References Cited

U.S. PATENT DOCUMENTS 7,033,423 B2 *  4/2006  Rolly ........................ 106/31.13
(Continued)

FOREIGN PATENT DOCUMENTS
JP          09-137101          5/1997
(Continued)

OTHER PUBLICATIONS

JP Office Action dtd Dec. 2, 2010, JP Appln. 2008-273888, partial English translation.

*Primary Examiner* — Helene Klemanski
(74) *Attorney, Agent, or Firm* — Banner & Witcoff, Ltd.

(57) ABSTRACT

The present invention provides a water-based black ink for ink-jet recording, containing a coloring agent and water. The coloring agent contains a yellow dye, a magenta dye, and a cyan dye. The yellow dye contains a dye (Y) represented by the following general formula (1). The magenta dye contains a dye (M) represented by the following general formula (2). The cyan dye contains a phthalocyanine dye (C). The dye (Y), the dye (M), and the phthalocyanine dye (C) are blended so as to satisfy the following conditions (a) and (b).
(a) Y:M (weight ratio)=about 2:3 to about 3:2
(b) (Y+M):C (weight ratio)=about 2:1 to about 2:3

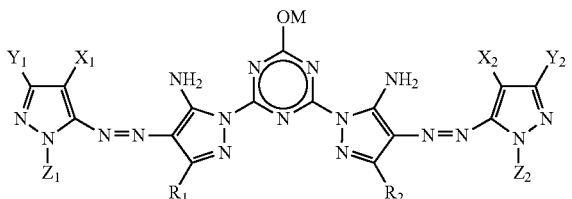

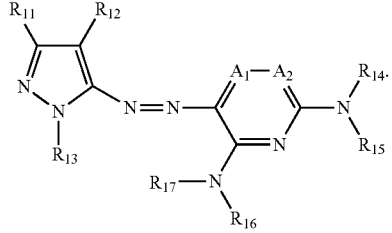

5 Claims, 1 Drawing Sheet

U.S. PATENT DOCUMENTS

| | | |
|---|---|---|
| 7,108,743 B2 | 9/2006 | Fujiwara et al. |
| 7,109,336 B2 | 9/2006 | Fujiwara et al. |
| 7,201,477 B2 | 4/2007 | Taguchi et al. |
| 7,211,134 B2 | 5/2007 | Tateishi et al. |
| 7,241,332 B2 * | 7/2007 | Yoshizawa et al. ........ 106/31.47 |
| 7,300,503 B2 | 11/2007 | Tateishi et al. |
| 7,425,233 B2 | 9/2008 | Hamajima et al. |
| 7,465,345 B2 * | 12/2008 | Okuda et al. ............... 106/31.28 |
| 7,507,282 B2 | 3/2009 | Ozawa et al. |
| 7,510,605 B2 | 3/2009 | Harada et al. |
| 7,520,928 B2 | 4/2009 | Ikeda et al. |
| 7,566,362 B2 | 7/2009 | Mori et al. |
| 7,615,112 B2 * | 11/2009 | Hayashida et al. ........ 106/31.27 |
| 7,713,343 B2 * | 5/2010 | Goto et al. ................. 106/31.48 |
| 7,717,991 B2 * | 5/2010 | Nishino et al. ............. 106/31.47 |
| 8,066,808 B2 * | 11/2011 | Taniguchi et al. ......... 106/31.27 |
| 2007/0173641 A1 | 7/2007 | Fujiwara et al. |
| 2007/0186807 A1 | 8/2007 | Goto et al. |
| 2008/0072788 A1* | 3/2008 | Okuda et al. ............... 106/31.28 |
| 2008/0145562 A1* | 6/2008 | Kitamura et al. ............. 427/466 |
| 2008/0168923 A1* | 7/2008 | Iwamura et al. ........... 106/31.13 |
| 2008/0241398 A1 | 10/2008 | Kato et al. |
| 2008/0274283 A1 | 11/2008 | Tateishi et al. |
| 2009/0047430 A1 | 2/2009 | Mori et al. |
| 2009/0165669 A1* | 7/2009 | Iwamura et al. ........... 106/31.13 |
| 2009/0165671 A1 | 7/2009 | Okuda et al. |
| 2009/0165672 A1 | 7/2009 | Ogura et al. |
| 2009/0165673 A1 | 7/2009 | Taniguchi et al. |
| 2009/0167830 A1 | 7/2009 | Iwamura |
| 2009/0167831 A1 | 7/2009 | Okuda et al. |

FOREIGN PATENT DOCUMENTS

| | | |
|---|---|---|
| JP | 2001-106946 | 4/2001 |
| JP | 2002-371079 | 12/2002 |
| JP | 2002-371214 | 12/2002 |
| JP | 2003-213168 | 7/2003 |
| JP | 2003-231823 | 8/2003 |
| JP | 2004-002670 | 1/2004 |
| JP | 2005-036164 | 2/2005 |
| JP | 2005-075778 | 3/2005 |
| JP | 2006-028261 | 2/2006 |
| JP | 2006-028450 | 2/2006 |
| JP | 2006-225558 | 8/2006 |
| JP | 2007-063520 | 3/2007 |
| JP | 2007-217523 | 8/2007 |
| JP | 2007-217524 | 8/2007 |
| JP | 2007-217525 | 8/2007 |
| JP | 2007-217526 | 8/2007 |
| JP | 2007-217527 | 8/2007 |
| JP | 2007-217528 | 8/2007 |
| JP | 2008-246821 | 10/2008 |
| JP | 2009-062515 A | 3/2009 |
| JP | 2009-155596 A | 7/2009 |
| JP | 2009-155597 A | 7/2009 |
| JP | 2009-155598 A | 7/2009 |
| JP | 2009-155599 A | 7/2009 |
| JP | 2009-155600 A | 7/2009 |
| JP | 2009-155601 A | 7/2009 |
| JP | 2009-155602 A | 7/2009 |
| JP | 2009-155603 A | 7/2009 |
| JP | 2009-155604 A | 7/2009 |
| JP | 2009-155605 A | 7/2009 |
| JP | 2010-037504 A | 2/2010 |
| WO | 2006-082669 | 8/2006 |

* cited by examiner

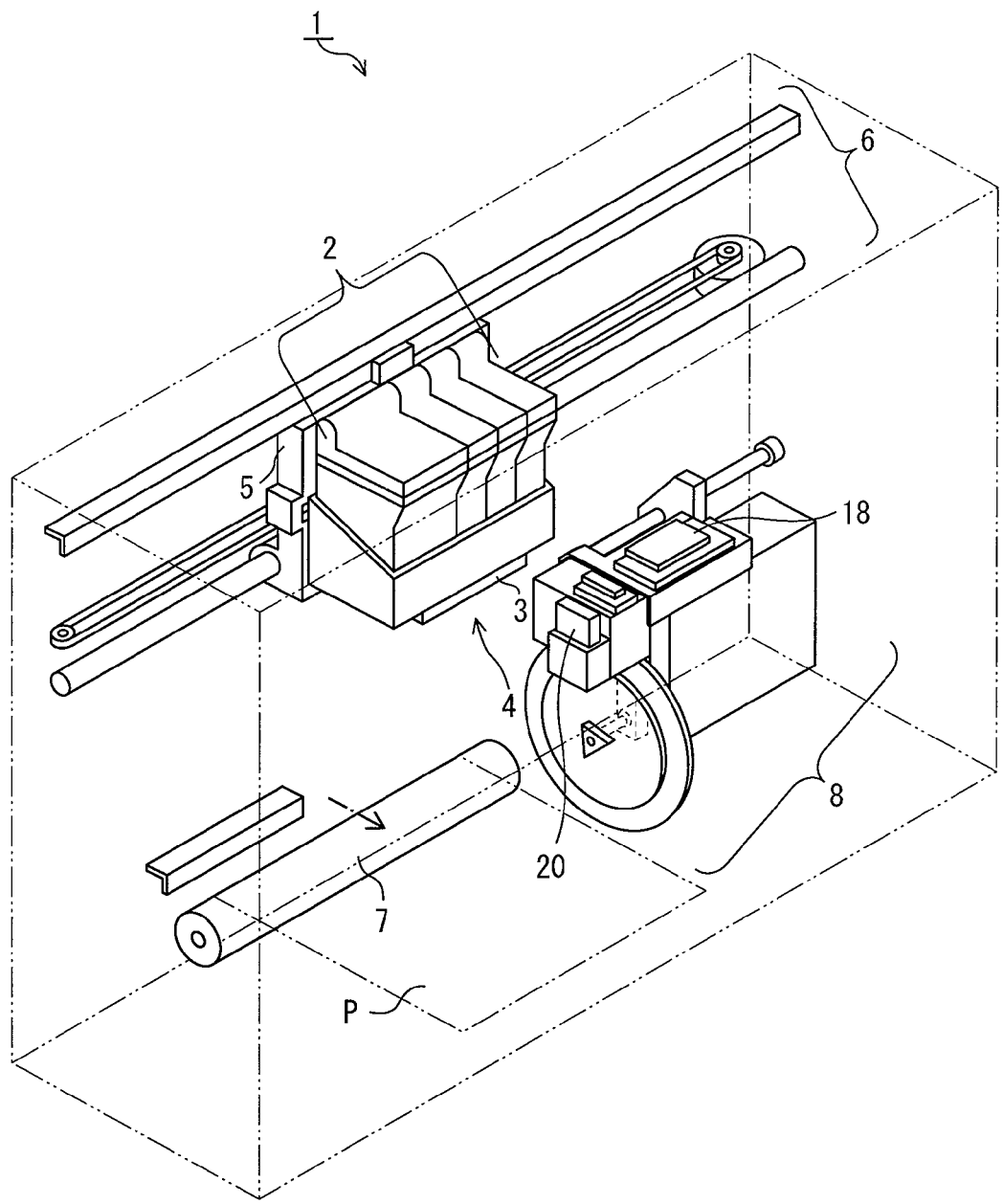

WATER-BASED BLACK INK FOR INK-JET RECORDING, INK CARTRIDGE, AND INK-JET RECORDING APPARATUS

CROSS-REFERENCE TO RELATED APPLICATION

This application claims priority from Japanese Patent Application No. 2008-273888 filed on Oct. 24, 2008. The entire subject matter of the Japanese Patent Application is incorporated herein by reference.

BACKGROUND

Heretofore, as a water-based black ink for ink-jet recording, an ink comprising a black dye and water has been used widely. Also, there has been proposed various water-based black inks that use a black dye in combination with dyes of other colors such as yellow, magenta, and cyan for the purpose of improving hue. However, these water-based black inks do not have sufficient light resistance.

Furthermore, in ink-jet recording, forming achromatic colors (for example, colors within the range of gradations from black to gray) by mixing three primary color inks, namely, a yellow ink, a magenta ink, and a cyan ink, on a recording medium at the time of recording is performed widely. However, by this method, when recording deep black, the total amount of the three primary color inks ejected might exceed the ink absorption capacity of the recording medium. On this account, for recording of achromatic colors, it is desirable to use a water-based black ink.

SUMMARY

A water-based black ink for ink-jet recording comprises a coloring agent and water. The coloring agent comprises a yellow dye, a magenta dye, and a cyan dye. The yellow dye comprises a dye (Y) represented by the following general formula (1), the magenta dye comprises a dye (M) represented by the following general formula (2), and the cyan dye comprises a phthalocyanine dye (C). The dye (Y), the dye (M), and the phthalocyanine dye (C) are blended so as to satisfy the following conditions (a) and (b).

(a) Y:M (weight ratio)=about 2:3 to about 3:2
(b) (Y+M):C (weight ratio)=about 2:1 to about 2:3

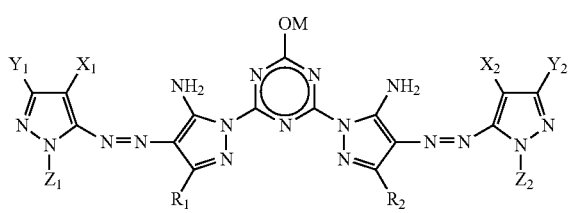

(1)

wherein in the general formula (1), $R_1, R_2, Y_1,$ and $Y_2$ each represent a monovalent group, and $R_1$, $R_2, Y_1,$ and $Y_2$ may be the same or different;

$X_1$ and $X_2$ each represent an electron attractive group, and $X_1$ and $X_2$ may be the same or different;

$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $Z_1$ and $Z_2$ may be the same or different; and M represents a hydrogen atom or a cation.

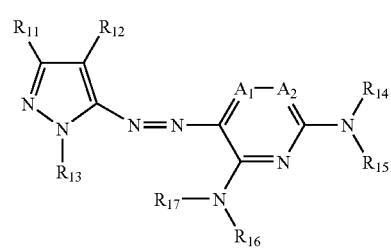

(2)

wherein in the general formula (2), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}, R_{15}, R_{16},$ and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_{14}, R_{15}, R_{16},$ and $R_{17}$ may be the same or different, provided that $R_{14}$ and $R_{15}$ are not both hydrogen atoms, and that $R_{16}$ and $R_{17}$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

An ink cartridge comprises the water-based black ink for ink-jet recording.

An ink-jet recording apparatus comprises an ink storing portion and an ink ejecting unit. An ink stored in the ink storing portion is ejected by the ink ejection unit. The ink cartridge is stored in the ink storing portion.

BRIEF DESCRIPTION OF THE DRAWINGS

FIG. 1 is a schematic perspective view showing an example of the configuration of the ink-jet recording apparatus.

DETAILED DESCRIPTION

In the water-based black ink for ink-jet recording, the dye (Y), the dye (M), and the phthalocyanine dye (C) may be blended so as to satisfy the following conditions (a1) and (b1) instead of the above-described conditions (a) and (b). Alternatively, they may be blended so as to satisfy the following conditions (a2) and (b2).

(a1) Y:M (weight ratio)=about 3:4 to about 4:3
(b1) (Y+M):C (weight ratio)=about 2:1 to about 3:4
(a2) Y:M (weight ratio)=about 4:5 to about 5:4
(b2) (Y+M):C (weight ratio)=about 2:1 to about 4:5

In the water-based black ink for ink-jet recording, it is preferable that the chroma C* is about 15 or less when recording is performed on a glossy photo paper using the water-based black ink in such a manner that the OD value is about 0.4 to about 0.6. It is more preferable that the chroma C* is about 15 or less even when the recording is performed in such a manner that the OD value is about 0.4 to about 1.0. It is still more preferable that the chroma C* is about 15 or less even when the recording is performed in such a manner that the OD value is about 0.4 to about 2.0. The chroma C* preferably is about 13 or less, more preferably about 10 or less. The lower limit of the chroma C* is not particularly limited, and may be 0, for example.

In the present invention, the term "glossy photo paper" refers to, for example, a recording paper having at least one coating layer on its recording surface. Examples of the glossy photo paper include a glossy photo paper "BP61GLA" manufactured by Brother Industries, Ltd., a glossy photo paper "BP71GLA" manufactured by Brother Industries, Ltd., an ink-jet paper "KASSAI SHASHIN-SHIAGE Pro" manufactured by FUJIFILM Corporation, a top-grade glossy paper "PWRA4-20" manufactured by KODAK JAPAN LTD, and the like. It is to be noted that, in the present invention, a glossy photo paper is used merely for evaluation of chroma C*, and a recording medium to be used is by no means limited to a glossy photo paper.

In the present invention, a "chroma C*" may be, for example, a C* value in the L*C*h color system, which is a color system created based on the L*a*b* color system (CIE 1976 (L*a*b*) color system) standardized by the International Commission on Illumination (CIE) in 1976.

In the water-based black ink for ink-jet recording, the phthalocyanine dye (C) may comprise a dye represented by the following general formula (3).

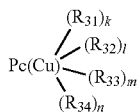

(3)

wherein in the general formula (3),

Pc (Cu) represents a copper phthalocyanine nucleus represented by the following general formula (Pc);

$R_{31}$, $R_{32}$, $R_{33}$, and $R_{34}$ each represent a substituent selected from the group consisting of $-SO_2R_a$, $-SO_2NR_bR_c$, and $-CO_2R_a$;

$R_{31}$, $R_{32}$, $R_{33}$, and $R_{34}$ are not all identical;

at least one of $R_{31}$, $R_{32}$, $R_{33}$, and $R_{34}$ has an ionic hydrophilic group as a substituent;

at least one of $R_{31}$, $R_{32}$, $R_{33}$, and $R_{34}$ is present on each of four benzene rings A, B, C, and D of the copper phthalocyanine nucleus represented by the general formula (Pc);

$R_a$ represents a substituted or unsubstituted alkyl group;

$R_b$ represents a hydrogen atom or a substituted or unsubstituted alkyl group;

$R_c$ represents a substituted or unsubstituted alkyl group;

k is an integer satisfying $0 < k < 8$;

l is an integer satisfying $0 < l < 8$;

m is an integer satisfying $0 \leq m < 8$;

n is an integer satisfying $0 \leq n < 8$; and k, l, m, and n are integers satisfying $4 \leq k+l+m+n \leq 8$.

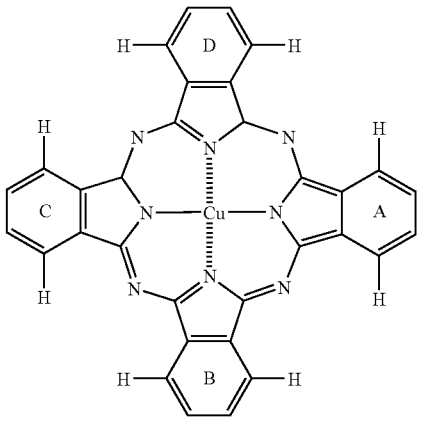

(Pc)

In the water-based black ink for ink-jet recording, the phthalocyanine dye (C) may comprise at least one dye selected from the group consisting of C. I. Direct Black 199, C. I. Direct Blue 86, and C. I. Direct Blue 307.

Next, the water-based black ink for ink-jet recording (hereinafter, this may also referred to simply as the "black ink" or "water-based black ink") is explained. The water-based black ink for ink-jet recording comprises a coloring agent and water. The coloring agent comprises a yellow dye, a magenta dye, and a cyan dye.

As described above, the yellow dye comprises the dye (Y) represented by the general formula (1).

In the general formula (1), $R_1$, $R_2$, $Y_1$, and $Y_2$ each represent a monovalent group, and $R_1$, $R_2$, $Y_1$, and $Y_2$ may be the same or different. The monovalent group is a hydrogen atom, or a monovalent substituent. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxycarbonyloxy group, an amino group such as an alkylamino group or an arylamino group, an amido group, an acylamino group, an ureido group, an amino carbonyl amino group, an alkoxy carbonyl amino group, an aryloxycarbonyl amino group, a sulfamoyl amino group, an alkyl sulfonyl amino group, an aryl sulfonyl amino group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxycarbonyl group, an alkoxy carbonyl group, a carbamoyl group, a phosphino group, a phosphinyl group, a phosphinyloxy group, a phosphinyl amino group, a silyl group, an azo group, an imido group, and the like. Each may further have a substituent. Out of these, the monovalent substituent may be a hydrogen atom, a halogen atom, an alkyl group, an aryl group, a heterocyclic group, a cyano group, an alkoxy group, an amido group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Further, the monovalent substituent may be a hydrogen atom, an alkyl group, an aryl group, a cyano group, or an alkyl sulfonyl group.

In the general formula (1), the halogen atom is a chlorine atom, a bromine atom, or an iodine atom. Out of these the halogen atom may be a chlorine atom, or a bromine atom.

In the general formula (1), the alkyl group includes a substituted or unsubstituted alkyl groups. The substituted or unsubstituted alkyl group may be an alkyl group having 1 to 30 carbon atoms. Examples of the alkyl group include a methyl group, an ethyl group, a butyl group, a tert-butyl group, an n-octyl group, an eicosyl group, a 2-chloroethyl group, a hydroxyethyl group, a cyano ethyl group, a 4-sulfobutyl group, and the like. Examples of the substituent of the substituted alkyl group include a straight or branched chain alkyl group having 1 to 12 carbon atoms such as a methyl group, an ethyl group, a propyl group, an isopropyl group, a sec-butyl group, a tert-butyl group, a 2-ethylhexyl group, a 2-methyl sulfonyl ethyl group, a 3-phenoxypropyl group, a trifluoromethyl group, and the like; a straight or branched chain aralkyl group having 7 to 18 carbon atoms; a straight or branched chain alkenyl group having 2 to 12 carbon atoms; a straight or branched chain alkynyl group having 2 to 12 carbon atoms; a straight or branched chain cycloalkyl group having 3 to 12 carbon atoms such as a cyclopentyl group, and the like; a straight or branched chain cycloalkenyl group having 3 to 12 carbon atoms; a halogen atom such as a chlorine atom, a bromine atom, and the like; an aryl group such as a phenyl group, a 4-tert-butylphenyl group, a 2,4-di-tert-amyl phenyl group, and the like; a heterocyclic group such as an imidazolyl group, a pyrazolyl group, a thoriazolyl group, a 2-furyl group, a 2-thienyl group, a 2-pyrimidinyl group, a 2-benzothiazolyl group, and the like; a cyano group; a hydroxyl group; a nitro group; a carboxy group; an amino group; an alkoxy group such as a methoxy group, an ethoxy group, a 2-methoxyethoxy group, a 2-methyl sulfonyl ethoxy group, and the like; an aryloxy group such as a phenoxy group, a 2-methyl phenoxy group, a 4-tert-butyl phenoxy group, a 3-nitro phenoxy group, a 3-tert-butyloxy carbonyl phenoxy group, a 3-methoxy carbonylphenyloxy group, and the like; an acylamino group such as an acetamide group, a benzamide group, a 4-(3-tert-butyl-4-hydroxy phenoxy) butane amide group, and the like; an alkylamino group such as a methylamino group, a butylamino group, a diethylamino group, a methyl butylamino group, and the like; an aryl amino group such as a phenyl amino group, a 2-chloroanilino group, and the like; an ureido group such as a phenylureido group, a methylureido group, an N,N-dibutylureido group, and the like; a sulfamoyl amino group such as an N,N-dipropyl sulfamoyl amino group, and the like; an alkyl thio group such as a methyl thio group, an octyl thio group, a 2-phenoxyethyl thio group, and the like; an aryl thio group such as a phenyl thio group, a 2-butoxy-5-tert-octylphenyl thio group, a 2-carboxy phenyl thio group, and the like; an alkoxy carbonyl amino group such as a methoxy carbonyl amino group, and the like; an alkyl sulfonyl amino group such as a methyl sulfonyl amino group, and the like; an aryl sulfonyl amino group such as a phenyl sulfonyl amino group, a p-toluene sulfonyl amino group, and the like; a carbamoyl group such as an N-ethyl carbamoyl group, an N,N-dibutyl carbamoyl group, and the like; a sulfamoyl group such as an N-ethyl sulfamoyl group, an N,N-dipropyl sulfamoyl group, an N-phenyl sulfamoyl group, and the like; a sulfonyl group such as a methyl sulfonyl group, an octyl sulfonyl group, a phenyl sulfonyl group, a p-toluene sulfonyl group, and the like; an alkoxy carbonyl group such as a methoxy carbonyl group, a butyloxy carbonyl group, and the like; a heterocyclic oxy group such as a 1-phenyltetrazol-5-oxy group, a 2-tetrahydropyranyloxy group, and the like; an azo group such as a phenylazo group, a 4-methoxyphenyl azo group, a 4-pivaloylamino phenylazo group, a 2-hydroxy-4-propanoyl phenylazo group, and the like; an acyloxy group such as an acetoxy group, and the like; a carbamoyloxy group such as an N-methyl carbamoyloxy group, an N-phenylcarbamoyloxy group, and the like; a silyloxy group such as a trimethyl silyloxy group, a dibutyl methyl silyloxy group, and the like; an aryloxy carbonyl amino group such as a phenoxy carbonyl amino group, and the like; an imido group such as an N-succinimido group, an N-phthalimido group, and the like; a heterocyclic thio group such as a 2-benzothiazolyl thio group, a 2,4-diphenoxy-1,3,5-triazole-6-thio group, a 2-pyridylthio group, and the like; a sulfinyl group such as a 3-phenoxypropyl sulfinyl group, and the like; a phosphonyl group such as a phenoxy phosphonyl group, an octyloxy phosphonyl group, a phenyl phosphonyl group, and the like; an aryloxy carbonyl group such as a phenoxy carbonyl group, and the like; an acyl group such as an acetyl group, a 3-phenyl propanoyl group, a benzoyl group, and the like; and an ionic hydrophilic group such as a carboxyl group, a sulfo group, a phosphono group, a quaternary ammonium group, and the like; and the like. With respect to the alkyl group, the aralkyl group, the alkenyl group, the alkynyl group, the cycloalkyl group, and the cycloalkenyl group, which are the substituents of the substituted alkyl group, those having branched chains may be used because they improve the solubility of the dye and the stability of the ink, and those having asymmetric carbons may be used. Out of these, a hydroxy group, an alkoxy group, a cyano group, a halogen atom, a sulfo group (which may also be in the form of a salt) or a carboxyl group (which may also be in the form of a salt) may be used.

In the general formula (1), the cycloalkyl group includes a substituted or unsubstituted cycloalkyl group. The substituted or unsubstituted cycloalkyl group may be a cycloalkyl group having 5 to 30 carbon atoms. Examples of the substituent of the substituted cycloalkyl group include the substituents described for the substituted alkyl group. Examples of the cycloalkyl group include a cyclohexyl group, a cyclopentyl group, a 4-n-dodecyl cyclohexyl group, and the like.

In the general formula (1), the aralkyl group includes a substituted or unsubstituted aralkyl group. The substituted or unsubstituted aralkyl group may be an aralkyl group having 7 to 30 carbon atoms. Examples of the substituent of the substituted aralkyl group include the substituents described for the substituted alkyl group. Examples of the aralkyl group include a benzyl group, a 2-phenethyl group, and the like.

In the general formula (1), the alkenyl group is a straight chain, branched, or cyclic substituted or unsubstituted alkenyl group. The substituted or unsubstituted alkenyl group may have 2 to 30 carbon atoms. Examples of the substituent of the substituted alkenyl group include the substituents described for the substituted alkyl group. Examples of the alkenyl group include a vinyl group, an allyl group, a prenyl group, a geranyl group, an oleyl group, a 2-cyclopenten-1-yl group, a 2-cyclohexen-1-yl group, and the like.

In the general formula (1), the alkynyl group is a substituted or unsubstituted alkynyl group having 2 to 30 carbon atoms. Examples of the substituent of the substituted alkynyl group include the substituents described for the substituted alkyl group. Examples of the alkynyl group include an ethynyl group, a propargyl group, and the like.

In the general formula (1), the aryl group is a substituted or unsubstituted aryl group having 6 to 30 carbon atoms. Examples of the aryl group include a phenyl group, a p-tolyl group, a naphthyl group, an m-chlorophenyl group, an o-hexadecanoyl aminophenyl group, and the like. Examples of the substituent of the substituted aryl group include the substituents described for the substituted alkyl group.

In the general formula (1), the heterocyclic group is a monovalent group obtained by removing one hydrogen atom from a 5- or 6-membered substituted or unsubstituted, aromatic or nonaromatic heterocyclic compound, which may also be further condensed. The heterocyclic group may be a 5- or 6-membered aromatic heterocyclic group having 3 to 30 carbon atoms. Examples of the substituent of the substituted heterocyclic group include the substituents described for the substituted alkyl group. Examples of the heterocyclic group include, with no limitation on a substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group, and the like.

In the general formula (1), the alkoxy group includes a substituted or unsubstituted alkoxy group. The substituted or unsubstituted alkoxy group may be an alkoxy group having 1 to 30 carbon atoms. Examples of the substituent of the substituted alkoxy group include the substituents described for the substituted alkyl group. Examples of the alkoxy group include a methoxy group, an ethoxy group, an isopropoxy group, an n-octyloxy group, a methoxyethoxy group, a hydroxyethoxy group, a 3-carboxy propoxy group, and the like.

In the general formula (1), the aryloxy group may be a substituted or unsubstituted aryloxy group having 6 to 30 carbon atoms. Examples of the substituent of the substituted aryloxy group include the substituents described for the substituted alkyl group. Examples of the aryloxy group include a phenoxy group, a 2-methyl phenoxy group, a 4-tert-butyl phenoxy group, a 3-nitro phenoxy group, a 2-tetradecanoyl amino phenoxy group, and the like.

In the general formula (1), the silyloxy group may be a silyloxy group having 3 to 20 carbon atoms. Examples of the silyloxy group include a trimethyl silyloxy group, a tert-butyldimethyl silyloxy group, and the like.

In the general formula (1), the heterocyclic oxy group may be a substituted or unsubstituted heterocyclic oxy group having 2 to 30 carbon atoms. Examples of the substituent of the substituted heterocyclic oxy group include the substituents described for the substituted alkyl group. Examples of the heterocyclic oxy group include a 1-phenyltetrazol-5-oxy group, a 2-tetrahydropyranyloxy group, and the like.

In the general formula (1), the acyloxy group may be a formyloxy group, a substituted or unsubstituted alkyl carbonyloxy group having 2 to 30 carbon atoms, or a substituted or unsubstituted aryl carbonyloxy group having 6 to 30 carbon atoms. Examples of the substituent of the substituted alkyl carbonyloxy group or the substituted aryl carbonyloxy group include the substituents described for the substituted alkyl group. Examples of the acyloxy group include a formyloxy group, an acetyloxy group, a pivaloyloxy group, a stearoyloxy group, a benzoyloxy group, a p-methoxyphenyl carbonyloxy group, and the like.

In the general formula (1), the carbamoyloxy group may be a substituted or unsubstituted carbamoyloxy group having 1 to 30 carbon atoms. Examples of the substituent of the substituted carbamoyloxy group include the substituents described for the substituted alkyl group. Examples of the carbamoyloxy group include an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group, and the like.

In the general formula (1), the alkoxy carbonyloxy group may be a substituted or unsubstituted alkoxy carbonyloxy group having 2 to 30 carbon atoms. Examples of the substituent of the substituted alkoxy carbonyloxy group include the substituents described for the substituted alkyl group. Examples of the alkoxy carbonyloxy group include a methoxy carbonyloxy group, an ethoxy carbonyloxy group, a tert-butoxy carbonyloxy group, an n-octyl carbonyloxy group, and the like.

In the general formula (1), the aryloxy carbonyloxy group may be a substituted or unsubstituted aryloxy carbonyloxy group having 7 to 30 carbon atoms. Examples of the substituent of the substituted aryloxy carbonyloxy group include the substituents described for the substituted alkyl group. Examples of the aryloxy carbonyloxy group include a phenoxy carbonyloxy group, a p-methoxyphenoxy carbonyloxy group, a p-n-hexadecyloxy phenoxy carbonyloxy group, and the like.

In the general formula (1), the amino group may be a substituted or unsubstituted alkylamino group having 1 to 30 carbon atoms, or a substituted or unsubstituted arylamino group having 6 to 30 carbon atoms. Examples of the substituents of the substituted alkylamino group and the substituted arylamino group include the substituents described for the substituted alkyl group. Examples of the amino group include an amino group, a methylamino group, a dimethylamino group, an anilino group, an N-methyl-anilino group, a diphenyl amino group, a hydroxyethylamino group, a carboxyethylamino group, a sulfoethylamino group, a 3,5-dicarboxy anilino group, and the like.

In the general formula (1), the acylamino group may be a formyl amino group, a substituted or unsubstituted alkyl carbonyl amino group having 1 to 30 carbon atoms, or a substituted or unsubstituted aryl carbonyl amino group having 6 to 30 carbon atoms. Examples of the substituents of the substituted alkyl carbonyl amino group and the substituted aryl carbonyl amino group include the substituents described for the substituted alkyl group. Examples of the acylamino group include a formylamino group, an acetylamino group, a pivaloylamino group, a lauroylamino group, a benzoylamino group, a 3,4,5-tri-n-octyloxyphenyl carbonyl amino group, and the like.

In the general formula (1), the amino carbonyl amino group may be a substituted or unsubstituted amino carbonyl amino group having 1 to 30 carbon atoms. Examples of the substituent of the substituted amino carbonyl amino group include the substituents described for the substituted alkyl group. Examples of the amino carbonyl amino group include a carbamoylamino group, an N,N-dimethylamino carbonyl amino group, an N,N-diethylamino carbonyl amino group, a morpholino carbonyl amino group, and the like.

In the general formula (1), the alkoxy carbonyl amino group may be a substituted or unsubstituted alkoxy carbonyl amino group having 2 to 30 carbon atoms. Examples of the substituent of the substituted alkoxy carbonyl amino group include the substituents described for the substituted alkyl group. Examples of the alkoxy carbonyl amino group include a methoxy carbonyl amino group, an ethoxy carbonyl amino group, a tert-butoxy carbonyl amino group, an n-octadecyloxy carbonyl amino group, an N-methyl-methoxy carbonyl amino group, and the like.

In the general formula (1), the aryloxy carbonyl amino group may be a substituted or unsubstituted aryloxy carbonyl amino group having 7 to 30 carbon atoms. Examples of the substituent of the substituted aryloxy carbonyl amino group include the substituents described for the substituted alkyl group. Examples of the aryloxy carbonyl amino group include a phenoxy carbonyl amino group, a p-chlorophenoxy carbonyl amino group, an m-n-octyloxy phenoxy carbonyl amino group, and the like.

In the general formula (1), the sulfamoyl amino group may be a substituted or unsubstituted sulfamoyl amino group having 0 to 30 carbon atoms. Examples of the substituent of the substituted sulfamoyl amino group include the substituents described for the substituted alkyl group. Examples of the sulfamoyl amino group include a sulfamoyl amino group, an N,N-dimethylamino sulfonyl amino group, an N-n-octylamino sulfonylamino group, and the like.

In the general formula (1), the alkyl sulfonyl amino group may be a substituted or unsubstituted alkyl sulfonyl amino group having 1 to 30 carbon atoms. Examples of the substituent of the substituted alkyl sulfonyl amino group include the substituents described for the substituted alkyl group. Examples of the alkyl sulfonyl amino group include a methyl sulfonyl amino group, a butyl sulfonyl amino group, and the like.

In the general formula (1), the aryl sulfonyl amino group may be a substituted or unsubstituted aryl sulfonyl amino group having 6 to 30 carbon atoms. Examples of the substituent of the substituted aryl sulfonyl amino group include the substituents described for the substituted alkyl group. Examples of the aryl sulfonyl amino group include a phenyl sulfonyl amino group, a 2,3,5-trichlorophenyl sulfonyl amino group, a p-methyl phenyl sulfonyl amino group, and the like.

In the general formula (1), the alkyl thio group may be a substituted or unsubstituted alkyl thio group having 1 to 30 carbon atoms. Examples of the substituent of the substituted alkyl thio group include the substituents described for the substituted alkyl group. Examples of the alkyl thio group include a methyl thio group, an ethyl thio group, an n-hexadecyl thio group, and the like.

In the general formula (1), the aryl thio group may be a substituted or unsubstituted aryl thio group having 6 to 30 carbon atoms. Examples of the substituent of the substituted aryl thio group include the substituents described for the substituted alkyl group. Examples of the aryl thio group include a phenyl thio group, a p-chlorophenyl thio group, an m-methoxyphenyl thio group, and the like.

In the general formula (1), the heterocyclic thio group may be a substituted or unsubstituted heterocyclic thio group having 2 to 30 carbon atoms. Examples of a substituent of the substituted heterocyclic thio group include the same substituents as those described for the substituted alkyl group. Examples of the heterocyclic thio group include 2-benzothiazolyl thio group, and 1-phenyltetrazole-5-ylthio group, and the like.

In the general formula (1), the sulfamoyl group may be a substituted or unsubstituted sulfamoyl group having 0 to 30 carbon atoms. Examples of the substituent of the substituted sulfamoyl group include the substituents described for the substituted alkyl group. Examples of the sulfamoyl group include an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N'-phenyl carbamoyl)sulfamoyl group, and the like.

In the general formula (1), the alkyl sulfinyl group may be a substituted or unsubstituted alkyl sulfinyl group having 1 to 30 carbon atoms. Examples of the substituent of the substituted alkyl sulfinyl group include the substituents described for the substituted alkyl group. Examples of the alkyl sulfinyl group include a methyl sulfinyl group, an ethyl sulfinyl group, and the like.

In the general formula (1), the aryl sulfinyl group may be a substituted or unsubstituted aryl sulfinyl group having 6 to 30 carbon atoms. Examples of the substituent of the substituted aryl sulfinyl group include the substituents described for the substituted alkyl group. Examples of the aryl sulfinyl group include a phenyl sulfinyl group, a p-methyl phenyl sulfinyl group, and the like.

In the general formula (1), the alkyl sulfonyl group may be a substituted or unsubstituted alkyl sulfonyl group having 1 to 30 carbon atoms. Examples of the substituent of the substituted alkyl sulfonyl group include the substituents described for the substituted alkyl group. Examples of the alkyl sulfonyl group include a methyl sulfonyl group, an ethyl sulfonyl group, and the like.

In the general formula (1), the aryl sulfonyl group may be a substituted or unsubstituted aryl sulfonyl group having 6 to 30 carbon atoms. Examples of the substituent of the substituted aryl sulfonyl group include the substituents described for the substituted alkyl group. Examples of the aryl sulfonyl group include a phenyl sulfonyl group, a p-toluene sulfonyl group, and the like.

In the general formula (1), the acyl group may be a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 4 to 30 carbon atoms, bound to a carbonyl group through a carbon atom. Examples of the substituents of the substituted alkyl carbonyl group, the substituted aryl carbonyl group, and the substituted heterocyclic carbonyl group include the substituents described for the substituted alkyl group. Examples of the acyl group include an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group, and the like.

In the general formula (1), the aryloxy carbonyl group may be a substituted or unsubstituted aryloxy carbonyl group having 7 to 30 carbon atoms. Examples of the substituent of the substituted aryloxy carbonyl group include the substituents described for the substituted alkyl group. Examples of the aryloxy carbonyl group include a phenoxy carbonyl group, an o-chlorophenoxy carbonyl group, an m-nitrophenoxy carbonyl group, a p-tert-butyl phenoxy carbonyl group, and the like.

In the general formula (1), the alkoxy carbonyl group may be a substituted or unsubstituted alkoxy carbonyl group having 2 to 30 carbon atoms. Examples of the substituent of the substituted alkoxy carbonyl group include the substituents described for the substituted alkyl group. Examples of the alkoxy carbonyl group include a methoxy carbonyl group, an ethoxy carbonyl group, a tert-butoxy carbonyl group, an n-octadecyloxy carbonyl group, and the like.

In the general formula (1), the carbamoyl group may be a substituted or unsubstituted carbamoyl group having 1 to 30 carbon atoms. Examples of the substituent of the substituted carbamoyl group include the substituents described for the substituted alkyl group. Examples of the carbamoyl group include a carbamoyl group, an N-methyl carbamoyl group, an N,N-dimethyl carbamoyl group, an N,N-di-n-octyl carbamoyl group, an N-(methyl sulfonyl)carbamoyl group, and the like.

In the general formula (1), the phosphino group may be a substituted or unsubstituted phosphino group having 2 to 30 carbon atoms. Examples of the substituent of the substituted phosphino group include the substituents described for the substituted alkyl group. Examples of the phosphino group include a dimethyl phosphino group, a diphenyl phosphino group, a methyl phenoxy phosphino group, and the like.

In the general formula (1), the phosphinyl group may be a substituted or unsubstituted phosphinyl group having 2 to 30 carbon atoms. Examples of the substituent of the substituted phosphinyl group include the substituents described for the substituted alkyl group. Examples of the phosphinyl group include a phosphinyl group, a dioctyloxy phosphinyl group, a diethoxy phosphinyl group, and the like.

In the general formula (1), the phosphinyloxy group may be a substituted or unsubstituted phosphinyloxy group having 2 to 30 carbon atoms. Examples of the substituent of the substituted phosphinyloxy group include the substituents described for the substituted alkyl group. Examples of the phosphinyloxy group include a diphenoxy phosphinyloxy group, a dioctyloxy phosphinyloxy group, and the like.

In the general formula (1), the phosphinyl amino group may be a substituted or unsubstituted phosphinyl amino group having 2 to 30 carbon atoms. Examples of the substituent of the substituted phosphinyl amino group include the substituents described for the substituted alkyl group. Examples of the phosphinyl amino group include a dimethoxy phosphinyl amino group, a dimethylamino phosphinyl amino group, and the like.

In the general formula (1), the silyl group may be a substituted or unsubstituted silyl group having 3 to 30 carbon atoms. Examples of the substituent of the substituted silyl group include the substituents described for the substituted alkyl group. Examples of the silyl group include a trimethyl silyl group, a tert-butyldimethyl silyl group, a phenyldimethyl silyl group, and the like.

In the general formula (1), examples of the azo group include a phenyl azo group, a 4-methoxyphenyl azo group, a 4-pivaloylamino phenyl azo group, a 2-hydroxy-4-propanoyl phenyl azo group, and the like.

In the general formula (1), examples of the imido group include an N-succinimido group, an N-phthalimido group, and the like.

In the general formula (1), $X_1$ and $X_2$ each represent an electron attractive group, and $X_1$ and $X_2$ may be the same or different. Examples of the $X_1$ and $X_2$ include an acyl group, an acyloxy group, a carbamoyl group, an alkoxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, an alkyl halide group, an alkoxy halide group, an aryloxy halide group, an alkylamino halide group, an alkyl thio halide group, an aryl group substituted with another electron attractive group, a heterocyclic group, a halogen atom, an azo group, a selenocyanate group, and the like.

$X_1$ and $X_2$ each may be an acyl group having 2 to 12 carbon atoms, an acyloxy group having 2 to 12 carbon atoms, a carbamoyl group having 1 to 12 carbon atoms, an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, an alkyl halide group having 1 to 12 carbon atoms, an alkoxy halide group having 1 to 12 carbon atoms, an alkyl thio halide group having 1 to 12 carbon atoms, an aryloxy halide group having 7 to 18 carbon atoms, an aryl group having 7 to 18 carbon atoms, substituted with two or more electron attractive groups other than the aryl group, and a 5- to 8-membered heterocyclic group having 1 to 18 carbon atoms and having a nitrogen atom, an oxygen atom, or a sulfur atom.

In the general formula (1), $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $Z_1$ and $Z_2$ may be the same or different. Examples of the alkyl group, the alkenyl group, the alkynyl group, the aralkyl group, the aryl group, and the heterocyclic group are the same as those described for $R_1$, $R_2$, $Y_1$, and $Y_2$.

In the general formula (1), M represents a hydrogen atom or a cation. The cation is an alkali metal ion, an ammonium ion, or a quaternary ammonium ion. The cation may be Li, Na, K, $NH_4$, or $NR_4$. R represents an alkyl group or an aryl group, and examples thereof are same as those of $R_1$, $R_2$, $Y_1$, and $Y_2$. Out of these, the cation may be Li, Na, K, or $NH_4$.

As for the combination of the substituents of the dye represented by the general formula (1), at least one of various substituents may be the aforementioned group. Further, a larger number of various substituents may be the aforementioned groups. Moreover, all the substituents may be the aforementioned groups.

The combinations of the substituents of the dye represented by the general formula (1) include the following (I) to (V).

(I) $R_1$ and $R_2$ may be the same or different, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. Out of these, $R_1$ and $R_2$ may be a straight chain alkyl group or branched alkyl group having 1 to 8 carbon atoms, a secondary or tertiary alkyl group, or a tert-butyl group.

(II) $X_1$ and $X_2$, each represent an electron attractive group, may be the same or different, a cyano group, an alkyl sulfonyl group having 1 to 12 carbon atoms, an aryl sulfonyl group having 6 to 18 carbon atoms, or a sulfamoyl group having 0 to 12 carbon atoms. Out of these, $X_1$ and $X_2$ may be a cyano group, or an alkyl sulfonyl group having 1 to 12 carbon atoms.

(III) $Y_1$ and $Y_2$ may be the same or different, a hydrogen atom, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. $Y_1$ and $Y_2$ may be a hydrogen atom, or a substituted or unsubstituted alkyl group. Out of these, $Y_1$ and $Y_2$ may be a hydrogen atom.

(IV) $Z_1$ and $Z_2$ may be the same or different, a substituted or unsubstituted alkyl group having 1 to 12 carbon atoms, a substituted or unsubstituted aryl group having 6 to 18 carbon atoms, or a substituted or unsubstituted heterocyclic group having 4 to 12 carbon atoms. $Z_1$ and $Z_2$ may be a substituted or unsubstituted aryl group, or a substituted or unsubstituted heterocyclic group. Out of these, $Z_1$ and $Z_2$ may be a substituted aryl group.

(V) M may be a hydrogen atom, an alkali metal ion, an ammonium ion, or a quaternary ammonium ion. Out of these, M may be a hydrogen atom, Li, Na, K, or $NH_4$.

Specific examples of the dye (Y) represented by the general formula (1) include compounds represented by the following structural formulae (1-A) to (1-E). In the following structural formulae (1-A) to (1-E), $C_4H_9(t)$ represents a tert-butyl group.

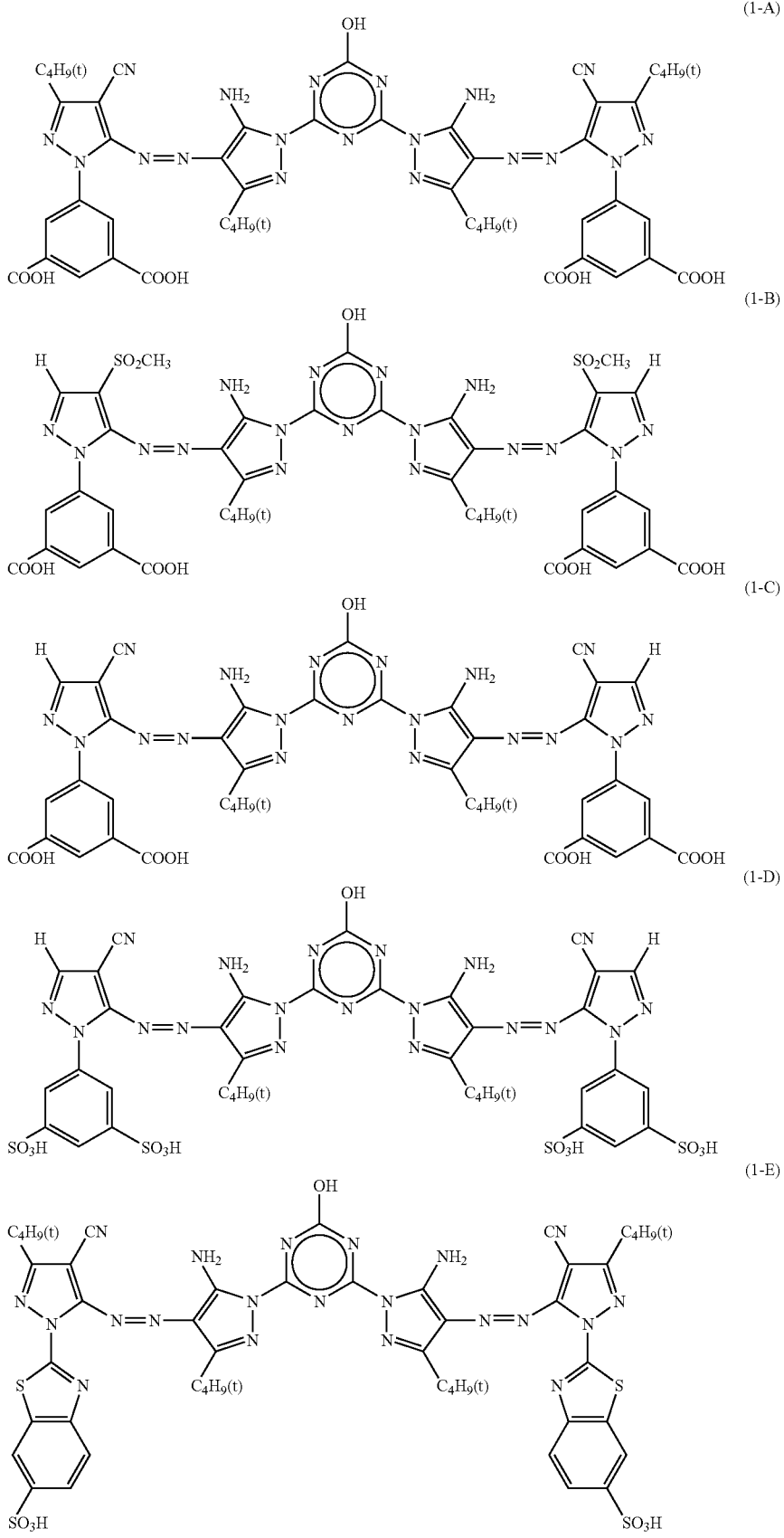

The yellow dye may contain only the dye (Y) or may further contain a yellow dye other than the dye (Y). The yellow dye other than the dye (Y) may be a dye having a light resistance equivalent to or higher than that of the dye (Y) or a combination of such dyes.

As described above, the magenta dye comprises the dye (M) represented by the general formula (2).

As described above, in the general formula (2), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_{14}$, $R_{15}$, $R_{16}$, and $R_{17}$ may be the same or different, provided that $R_{14}$ and $R_{15}$ are not both hydrogen atoms, and that $R_{16}$ and $R_{17}$ are not both hydrogen atoms; and $A_1$ and $A_2$ are both substituted or unsubstituted carbon atoms, or one of $A_1$ and $A_2$ is a substituted or unsubstituted carbon atom and the other is a nitrogen atom.

In the general formula (2), the substituted or unsubstituted alkyl group may be an alkyl group having 1 to 6 carbon atoms. Examples of the substituted or unsubstituted alkyl group include a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. Examples of the substituent of the substituted alkyl group include a hydroxyl group; an alkoxy group such as a methoxy group, an ethoxy group, and the like; a cyano group; a halogen atom such as a fluorine atom, a chlorine atom, a bromine atom, an iodine atom, and the like; an ionic hydrophilic group such as a carboxylate, a sulfonate, and the like; and the like.

In the general formula (2), the substituted or unsubstituted aryl group may be an aryl group having 6 to 12 carbon atoms. However, in a case of the substituted aryl group, the number of carbon atoms does not include the number of carbon atoms of its substituent(s). Examples of the substituted or unsubstituted aryl group include a phenyl group, a naphthyl group, a p-tolyl group, a p-octylphenyl group, a mesityl group, a p-methoxyphenyl group, an o-chlorophenyl group, an m-(3-sulfopropylamino)phenyl group, and the like. Examples of the substituent of the substituted aryl group include an alkyl group such as a methyl group, an ethyl group, an isopropyl group, a tert-butyl group, an n-octyl group, and the like; the same alkoxy group as described above; the same halogen atom as described above; an alkylamino group such as a methylamino group, a dimethylamino group, and the like; an amide group; a carbamoyl group; a sulfamoyl group; a sulfoamide group; a hydroxyl group; an ester group such as a methoxycarbonyl group, an ethoxycarbonyl group, and the like; and the same ionic hydrophilic group as described above.

In the general formula (2), examples of the halogen atom include a fluorine atom, a chlorine atom, a bromine atom, an iodine atom, and the like.

In the general formula (2), the substituted or unsubstituted heterocyclic group may be a 5- or 6-membered heterocyclic group. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group and the like. Examples of a substituent of the substituted heterocyclic group include an amide group, a carbamoyl group, a sulfamoyl group, a sulfoamide group, a hydroxyl group, the same ester group as described above, the same ionic hydrophilic group as described above, and the like.

In the general formula (2), examples of the substituted or unsubstituted sulfonyl group include a methylsulfonyl group, a phenylsulfonyl group, and the like. Examples of the substituent of a substituted sulfonyl group include the same substituted or unsubstituted alkyl group as described above, the same substituted or unsubstituted aryl group as described above, and the like.

In the general formula (2), the substituted or unsubstituted acyl group may be an acyl group having 1 to 12 carbon atoms. However, in the case of the substituted acyl group, the number of carbon atoms does not include the number of carbon atoms of its substituent(s). Examples of the substituted or unsubstituted acyl group include an acetyl group, a benzoyl group, a chloroacetyl group, and the like. Examples of the substituent of the substituted acyl group include the same ionic hydrophilic group as described above and the like.

As has been described, in the general formula (2), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ may be both substituted or unsubstituted carbon atoms because better performance may be obtained. Examples of the substituent bound to the carbon atoms $A_1$ and $A_2$ include an alkyl group having 1 to 3 carbon atoms, a carboxyl group, a carbamoyl group, a cyano group, and the like.

As has been described, in the general formula (2), $R_{14}$ and $R_{15}$ are not both hydrogen atoms, and also $R_{16}$ and $R_{17}$ are not both hydrogen atoms. Moreover, in the general formula (2), when the number of substituents of a sulfonic acid group or a carboxyl group is increased, the water solubility of the dye represented by the general formula (2) tends to be improved. Therefore, the number of these substituents may be adjusted in accordance with need.

One embodiment of the dye (M) is an embodiment where, in the general formula (2), $R_{11}$ is an alkyl group; $R_{12}$ is a cyano group; $R_{13}$ is a hydrogen atom or a substituted or unsubstituted heterocyclic group; $R_{14}$ is a hydrogen atom, a substituted or unsubstituted heterocyclic group, or a substituted aryl group; $R_{15}$ and $R_{16}$ each are a substituted heterocyclic group or a substituted aryl group; $R_{17}$ is a hydrogen atom; $A_1$ is a substituted carbon atom; and $A_2$ is a substituted or unsubstituted carbon atom.

Another embodiment of the dye (M) is an embodiment where, in the general formula (2), $R_{11}$ is a tert-butyl group; $R_{12}$ is a cyano group; $R_{13}$ is a hydrogen atom or a benzothiazolyl group optionally substituted with a sulfonic acid group or an alkali metal sulfonate group (for example, a benzothiazole-2-yl group); $R_{14}$ is a hydrogen atom, a benzothiazolyl group optionally substituted with a sulfonic acid group or an alkali metal sulfonate group (for example, a benzothiazole-2-yl group), or a trialkylphenyl group substituted with a sulfonic acid group or an alkali metal sulfonate group (for example, a mesityl group); $R_{15}$ and $R_{16}$ each are a monoalkylphenyl, dialkylphenyl, or trialkylphenyl group optionally substituted with a sulfonic acid group or an alkali metal sulfonate group (for example, a p-octylphenyl or a mesityl group) or a benzothiazolyl group substituted with a sulfonic acid group or an alkali metal sulfonate group (for example, a benzothiazole-2-yl group); $R_{17}$ is a hydrogen atom; $A_1$ is a carbon atom substituted with an alkyl group (for example, a methyl group); and $A_2$ is a carbon atom optionally substituted with a cyano group.

Specific examples of the dye (M) include compounds represented by the following structural formulae (2-A) to (2-F).

(2-A)

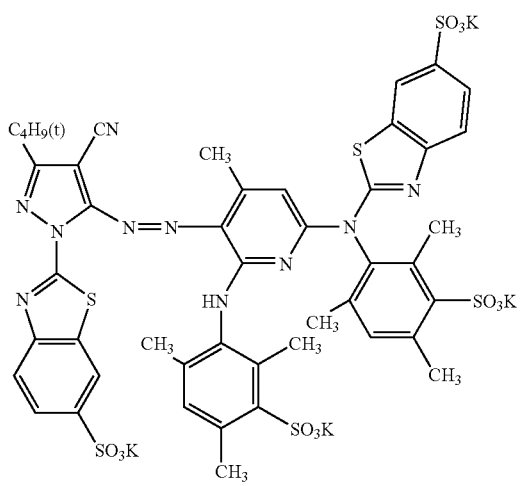

The compound represented by the structural formula (2-A) is an embodiment of the dye (M), where, in the general formula (2), $R_{11}$ is a tert-butyl group; $R_{12}$ is a cyano group; $R_{13}$ and $R_{14}$ each are a 6-potassium sulfonate benzothiazole-2-yl group; $R_{15}$ and $R_{16}$ each are a 3-potassium sulfonate mesityl group; $R_{17}$ is a hydrogen atom; $A_1$ is a carbon atom substituted with a methyl group; and $A_2$ is a carbon atom.

(2-B)

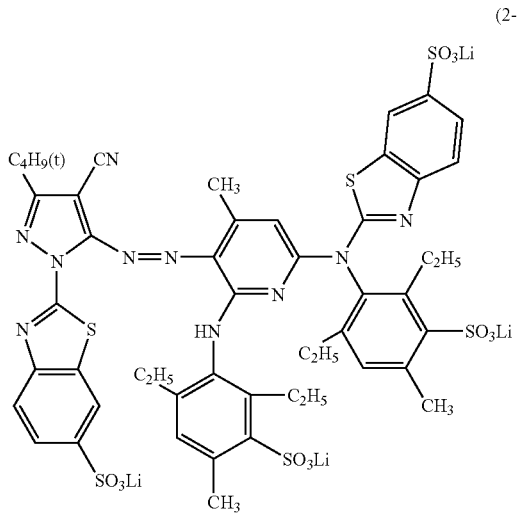

The compound represented by the structural formula (2-B) is another embodiment of the dye (M), where, in the general formula (2), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-methyl-3-lithium sulfonate phenyl group; $R_{17}$ is a hydrogen atom; $A_1$ is a carbon atom substituted with a methyl group; and $A_2$ is a carbon atom.

(2-C)

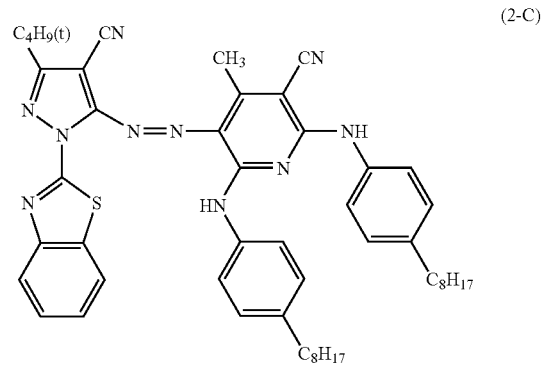

The compound represented by the structural formula (2-C) is still another embodiment of the dye (M), where, in the general formula (2), $R_{11}$ is a tert-butyl group; $R_{12}$ is a cyano group; $R_{13}$ is a benzothiazole-2-yl group; $R_{14}$ is a hydrogen atom; $R_{15}$ and $R_{16}$ each are a p-octylphenyl group; $R_{17}$ is a hydrogen atom; $A_1$ is a carbon atom substituted with a methyl group; and $A_2$ is a carbon atom substituted with a cyano group.

(2-D)

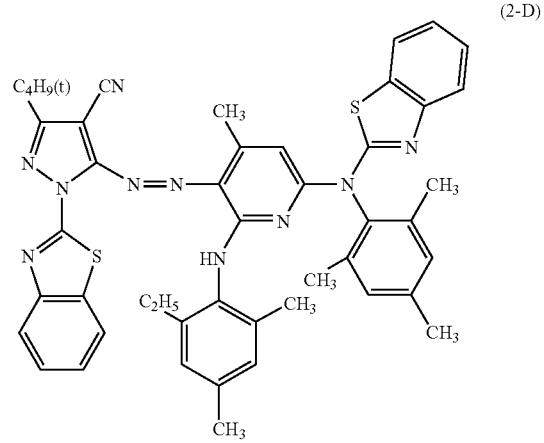

The compound represented by the structural formula (2-D) is yet another embodiment of the dye (M), where, in the general formula (2), $R_{11}$ is a tert-butyl group; $R_{12}$ is a cyano group; $R_{13}$ and $R_{14}$ each are a benzothiazole-2-yl group; $R_{15}$ and $R_{16}$ each are a mesityl group; $R_{17}$ is a hydrogen atom; $A_1$ is a carbon atom substituted with a methyl group; and $A_2$ is a carbon atom.

(2-E)

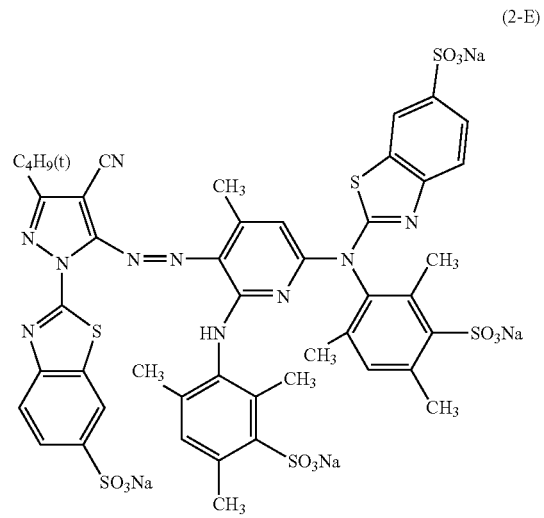

The compound represented by the structural formula (2-E) is yet another embodiment of the dye (M), where, in the general formula (2), $R_{11}$ is a tert-butyl group; $R_{12}$ is a cyano group; $R_{13}$ and $R_{14}$ each are a 6-sodium sulfonate benzothiazole-2-yl group; $R_{15}$ and $R_{16}$ each are a 3-sodium sulfonate mesityl group; $R_{17}$ is a hydrogen atom; $A_1$ is a carbon atom substituted with a methyl group; and $A_2$ is a carbon atom.

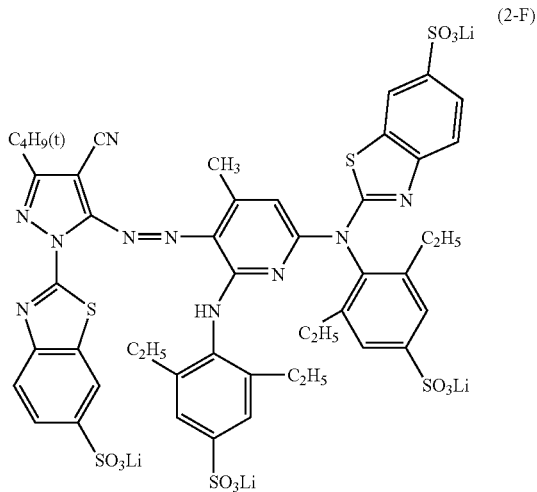

(2-F)

The compound represented by the structural formula (2-F) is yet another embodiment of the dye (M), where, in the general formula (2), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-lithium sulfonate phenyl group; $R_{17}$ is a hydrogen atom; $A_1$ is a carbon atom substituted with a methyl group; and $A_2$ is a carbon atom.

The magenta dye may contain only the dye (M) or may further contain a magenta dye other than the dye (M). The magenta dye other than the dye (M) may be a dye having a light resistance equivalent to or higher than that of the dye (M) or a combination of such dyes.

As described above, the cyan dye contains the phthalocyanine dye (C). The phthalocyanine dye means a cyan dye having a phthalocyanine structure.

As described above, the phthalocyanine dye (C) may comprise the dye represented by the general formula (3).

As described above, in the general formula (3),

Pc (Cu) represents a copper phthalocyanine nucleus represented by the following general formula (Pc);

$R_{31}$, $R_{32}$, $R_{33}$, and $R_{34}$ each represent a substituent selected from the group consisting of —SO$_2$R$_a$, —SO$_2$NR$_b$R$_c$, and —CO$_2$R$_a$;

$R_{31}$, $R_{32}$, $R_{33}$, and $R_{34}$ are not all identical;

at least one of $R_{31}$, $R_{32}$, $R_{33}$, and $R_{34}$ has an ionic hydrophilic group as a substituent;

at least one of $R_{31}$, $R_{32}$, $R_{33}$, and $R_{34}$ is present on each of four benzene rings A, B, C, and D of the copper phthalocyanine nucleus represented by the general formula (Pc);

$R_a$ represents a substituted or unsubstituted alkyl group;

$R_b$ represents a hydrogen atom or a substituted or unsubstituted alkyl group;

$R_c$ represents a substituted or unsubstituted alkyl group;

k is an integer satisfying $0 < k < 8$;

l is an integer satisfying $0 < l < 8$;

m is an integer satisfying $0 \leq m < 8$;

n is an integer satisfying $0 \leq n < 8$; and k, l, m, and n are integers satisfying $4 \leq k+l+m+n \leq 8$.

In the general formula (3), the substituted or unsubstituted alkyl group may be a straight, branched, or alicyclic alkyl group having 1 to 12 carbon atoms. The alkyl group may be a branched alkyl group, in particular, an alkyl group having an asymmetric carbon atom (in the form of racemic body), from the view point of improving the solubility of the dye and the stability of the ink. Examples of the substituted or unsubstituted alkyl group include a methyl group, an ethyl group, an n-butyl group, an isopropyl group, a tert-butyl group, a hydroxy ethyl group, a methoxy ethyl group, a cyano ethyl group, a trifluoromethyl group, a 3-sulfo propyl group, a 4-sulfo butyl group, and the like.

In the general formula (3), examples of a substituent of the substituted alkyl group include a straight or branched alkyl group having 1 to 12 carbon atoms such as a methyl group, an ethyl group, a propyl group, an isopropyl group, a sec-butyl group, a tert-butyl group, a 2-ethylhexyl group, a 2-methylsulfonyl ethyl group, a 3-phenoxy propyl group, a trifluoromethyl group, a cyclopentyl group, and the like; a straight or branched aralkyl group having 7 to 18 carbon atoms; a straight or branched alkenyl group having 2 to 12 carbon atoms; a straight or branched alkynyl group having 2 to 12 carbon atoms; a straight or branched cycloalkyl group having 3 to 12 carbon atoms; a straight or branched cycloalkenyl group having 3 to 12 carbon atoms; a halogen atom such as a chlorine atom, a bromine atom, and the like; an aryl group such as a phenyl group, a 4-tert-butylphenyl group, a 2,4-di-tert-amylphenyl group, and the like; a heterocyclic group such as an imidazolyl group, a pyrazolyl group, a triazolyl group, a 2-furil group, a 2-thienyl group, 2-pyrimidinyl group, a 2-benzothiazolyl group, and the like; a cyano group; a hydroxyl group; a nitro group; a carboxy group; an amino group; an alkoxy group such as a methoxy group, an ethoxy group, a 2-methoxyethoxy group, a 2-methanesulfonylethoxy group, and the like; an aryloxy group such as a phenoxy group, a 2-methylphenoxy group, a 4-tert-butylphenoxy group, a 3-nitrophenoxy group, a 3-tert-butoxycarbamoylphenoxy group, a 3-methoxycarbamoyl group, and the like; an acylamino group such as an acetamide group, a benzamide group, a 4-(3-tert-butyl-4-hydroxyphenoxy) butanamide group, and the like; an alkylamino group such as a methylamino group, a butylamino group, a diethylamino group, a methylbutylamino group, and the like; an anilino group such as a phenylamino group, a 2-chloroanilino group, and the like; an ureide group such as a phenylureide group, a methylureide group, an N,N-dibutylureide group, and the like; a sulfamoylamino group such as an N,N-dipropylsulfamoylamino group, and the like; an alkylthio group such as a methylthio group, an octylthio group, a 2-phenoxyethylthio group, and the like; an arylthio group such as a phenylthio group, a 2-butoxy-5-tert-octylphenylthio group, a 2-carboxyphenylthio group, and the like; an alkyloxycarbonylamino group such as a methoxycarbonylamino group, and the like; a sulfonamide group such as a methanesulfonamide group, a benzenesulfonamide group, a p-toluenesulfonamide group, and the like; a carbamoyl group such as an N-ethylcarbamoyl group, an N,N-dibutylcarbamoyl group, and the like; a sulfamoyl group such as an N-ethylsulfamoyl group, an N,N-dipropylsulfamoyl group, an N-phenylsulfamoyl group and the like; a sulfonyl group such as a methanesulfonyl group, an octanesulfonyl group, an benzenesulfonyl group, a toluenesulfonyl group, and the like; an alkyloxycarbonyl group such as a methoxycarbonyl group, a butyloxycarbonyl group, and the like; a heterocyclic oxy group such as a 1-phenyltetrazole-5-oxy group, a 2-tetrahydropyranyloxy group, and the like; an azo group such as a phenylazo group, a 4-methoxyphenylazo group, a 4-pivaloylaminophenylazo group, a 2-hydroxy-4- propanoylphenylazo group, and the like; an acyloxy group such as an acetoxy group, and the like; a carbamoyloxy group such as an N-methylcarbamoyloxy group, an N-phenylcarbamoyloxy group, and the like; a silyloxy group such as a trimethylsilyloxy group, a dibutylmethylsilyloxy group, and the like; an aryloxycarbonylamino group such as a phenoxycarbonylamino group, and the like; an imide group such as a N-succinimide group, an N-phthalimide group, and the like; a heterocyclic thio group such as a 2-benzothiazolylthio group, a 2,4-diphenoxy-1,3,5-triazole-6-thio group, a 2-pyridylthio group, and the like; a sulfinyl group such as a 3-phenoxypropylsulfinyl group, and the like; a phosphonyl group such as a phenoxyphosphonyl group, an octyloxyphosphonyl group, a phenylphosphonyl group, and the like; an aryloxycarbonyl group such as a phenoxycarbonyl group and the like; an acyl group such as an acetyl group, a 3-phenylpropanoyl group, a benzoyl group, and the like; and an ionic hydrophilic group such as a carboxyl group, a sulfo group, a phosphono group, a quaternary ammonium group, and the like; and the like. With respect to the alkyl group, the aralkyl group, the alkenyl group, the alkynyl group, the cycloalkyl group, and the cycloalkenyl group, which are the substituents of the substituted alkyl group, those having branched chains may be used because they improve the solubility of the dye and the stability of the ink, and those having asymmetric carbons may be used.

One embodiment of the phthalocyanine dye (C) is an embodiment where, for example, in the general formula (3), $R_{31}$, $R_{32}$, $R_{33}$, and $R_{34}$ each are $-SO_2R_a$; the respective $R_a$s in $R_{31}$, $R_{32}$, $R_{33}$, and $R_{34}$ are not all identical; and at least one of the $R_a$s is a substituted alkyl group having an ionic hydrophilic group.

Another embodiment of the phthalocyanine dye (C) is an embodiment where, for example, in general formula (3), k is an integer satisfying $0<k<4$; l is an integer satisfying $0<l<4$; m is an integer satisfying $0\leq m<4$; n is an integer satisfying $0\leq n<4$; and k, l, m, and n are integers satisfying $k+l+m+n=4$.

Specific examples of the phthalocyanine dye (C) include compounds represented by the following structural formulae (3-A) to (3-E).

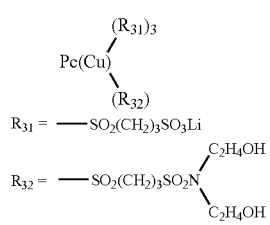

(3-A)

The compound represented by the structural formula (3-A) is an embodiment of the phthalocyanine dye (C), where, in the general formula (3), $R_{31}$ is a lithium sulfonato propylsulfonyl group; $R_{32}$ is an N,N-(di(2-hydroxyethyl))sulfamoylpropylsulfonyl group; k is 3; l is 1; and m and n are both 0.

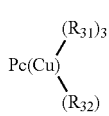

(3-B)

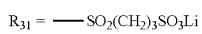
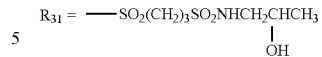

The compound represented by the structural formula (3-B) is another embodiment of the phthalocyanine dye (C), where, in the general formula (3), $R_{31}$ is a lithium sulfonato propylsulfonyl group; $R_{32}$ is an N-(2-hydroxypropyl)sulfamoylpropylsulfonyl group; k is 3; l is 1; and m and n are both 0.

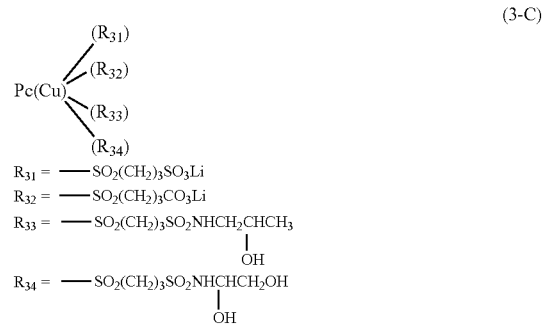

(3-C)

The compound represented by the structural formula (3-C) is still another embodiment of the phthalocyanine dye (C), where, in the general formula (3), $R_{31}$ is a lithium sulfonato propylsulfonyl group; $R_{32}$ is a lithium carboxylate propylsulfonyl group; $R_{33}$ is an N-(2-hydroxypropyl) sulfamoylpropylsulfonyl group; $R_{34}$ is an N-(2-hydroxyisopropyl) sulfamoylpropylsulfonyl group; and k, l, m, and n are all 1.

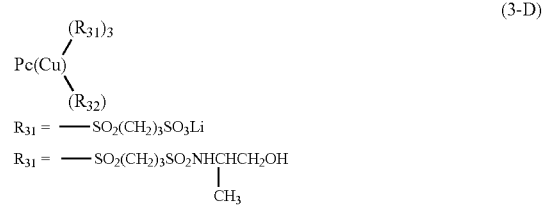

(3-D)

The compound represented by the structural formula (3-D) is yet another embodiment of the phthalocyanine dye (C), where, in the general formula (3), $R_{31}$ is a lithium sulfonato propylsulfonyl group; $R_{32}$ is an N-(2-hydroxyisopropyl) sulfamoylpropylsulfonyl group; k is 3; l is 1; and m and n are both 0.

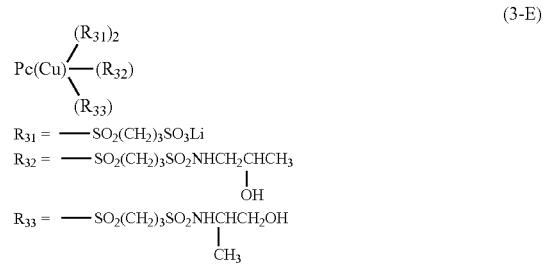

(3-E)

The compound represented by the structural formula (3-E) is yet another embodiment of the phthalocyanine dye (C), where, in the general formula (3), $R_{31}$ is a lithium sulfonato propylsulfonyl group; $R_{32}$ is an N-(2-hydroxypropyl)sulfamoylpropylsulfonyl group; $R_{33}$ is an N-(2-hydroxyisopropyl)sulfamoylpropylsulfonyl group; k is 2; l is 1; m is 1; and n is 0.

Furthermore, the phthalocyanine dye (C) may comprise, in addition to or instead of the dye represented by the general formula (3), at least one dye selected from C. I. Direct Blue 199, C. I. Direct Blue 86, and C. I. Direct Blue 307. C. I. Direct Blue 199 is a dye represented by the following general formula (4), for example.

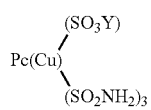
(4)

In the general formula (4), Pc (Cu) represents a copper phthalocyanine nucleus represented by the general formula (Pc); substituents —$SO_3Y$ and —$SO_2NH_2$ are present on any of four benzene rings A, B, C, and D in the copper phthalocyanine nucleus represented by the general formula (Pc); and Y represents a counter ion such as a hydrogen ion, a lithium ion, a sodium ion, a potassium ion, an ammonium ion, or the like.

The cyan dye may contain only the phthalocyanine dye (C) or may further contain a cyan dye other than the phthalocyanine dye (C). The cyan dye other than the phthalocyanine dye (C) may be a dye having a light resistance equivalent to or higher than that of the phthalocyanine dye (C) or a combination of such dyes.

In the water-based black ink for ink-jet recording, the total amount of the coloring agent blended may be, for example, about 0.1 wt % to about 20 wt %, about 0.2 wt % to about 15 wt %, or about 0.5 wt % to about 10 wt % relative to the total amount of the ink. The blend ratio between the respective dyes in the coloring agent is not particularly limited as long as the conditions (a) and (b) are satisfied.

The water may be ion-exchange water or purified water. The amount of the water to be added with respect to the total amount of the ink is, for example, in the range of about 10 wt % to about 90 wt %, and about 40 wt % to about 80 wt %. The amount of the water to be added may be a balance of the other components, for example.

The water-based black ink for ink-jet recording may further comprise a humectant and a penetrant. The humectant prevents an ink from drying at a nozzle portion of an ink-jet head, for example. The penetrant adjusts a drying rate of an ink on a recording medium, for example.

The humectant is not particularly limited, and examples thereof include lower alcohol such as methyl alcohol, ethyl alcohol, n-propyl alcohol, isopropyl alcohol, n-butyl alcohol, sec-butyl alcohol, tert-butyl alcohol, and the like; amide such as dimethylformamide, dimethylacetamide, and the like; ketone such as acetone, and the like; ketoalcohol such as diacetone alcohol, and the like; ether such as tetrahydrofuran, dioxane, and the like; polyalcohol such as polyalkylene glycol, alkylene glycol, glycerin, and the like; 2-pyrrolidone; N-methyl-2-pyrrolidone; 1,3-dimethyl-2-imidazolidinone; and the like. The polyalkylene glycol is not particularly limited, and examples thereof include polyethylene glycol, polypropylene glycol, and the like. The alkylene glycol is not particularly limited and examples thereof include ethylene glycol, propylene glycol, butylene glycol, diethylene glycol, triethylene glycol, dipropylene glycol, tripropylene glycol, thiodiglycol, hexylene glycol, and the like. Out of these, the humectant may be polyalcohol such as alkylene glycol, glycerin, and the like. One of the humectants may be used alone or two or more of them may be used in combination.

The amount of the humectant to be added with respect to the total amount of the ink (the proportion of the humectant in the ink) is not particularly limited and is, for example, in the range of 0 wt % to about 95 wt %, about 5 wt % to about 80 wt %, and about 5 wt % to about 50 wt %.

The penetrant is not particularly limited, and an example thereof includes glycol ether. The glycol ether is not particularly limited, and examples thereof include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added with respect to the total amount of the ink (the proportion of the penetrant in the ink) is not particularly limited and is, for example, in the range of 0 wt % to about 20 wt %. Setting of the proportion of the penetrant in the aforementioned range makes it possible to achieve suitable penetration of the water-based ink relative to a recording medium such as a recording paper. The proportion of the penetrant may be in the range of about 0.1 wt % to about 15 wt %, and about 0.5 wt % to about 10 wt %.

The water-based black ink for ink-jet recording may further comprise a conventionally known additive as required. Examples of the additive include a surfactant, a viscosity modifier, a surface tension modifier, a mildewproofing agent, and the like. Examples of the viscosity modifier include polyvinyl alcohol, cellulose, water-soluble resin, and the like.

The water-based black ink for ink-jet recording may be prepared by uniformly mixing the coloring agent and water with other added components as required by a conventionally known method, and then removing sediments with a filter, for example.

In the water-based black ink for ink-jet recording, the dye (Y), the dye (M), and the phthalocyanine dye (C) are blended so as to satisfy the above-described conditions (a) and (b). This allows the water-based black ink to have high light resistance and excellent hue. When recording is performed on a glossy photo paper using the water-based black ink for ink-jet recording in such a manner that the OD value is about 0.4 to about 0.6, it is possible to achieve a chroma C* of, for example, about 15 or less, whereby achromatic colors can be expressed sufficiently.

The water-based black ink for ink-jet recording may be used as an ink set in combination with water-based inks of other colors. The ink set may include at least one water-based ink selected from the group consisting of a water-based yellow ink, a water-based magenta ink, and a water-based cyan ink, or it may include all the water-based inks of these three colors. The ink set is applicable to full-color recording when it includes the water-based inks of the above-described three colors. The ink set may further include a water-based ink of a color other than the three colors. Examples of the water-based ink of a color other than the three colors include a water-based red ink, a water-based green ink, a water-based blue ink, water-based light inks with low dye concentrations (for example, a water-based light yellow ink, a water-based light magenta ink, a water-based light cyan ink, a water-based light black ink, a water-based light red ink, a water-based light green ink, and a water-based light blue ink), and the like. As the above-described water-based inks, conventionally known water-based inks can be used, for example. The water-based yellow ink, the water-based magenta ink, and the water-based cyan ink may contain the dye (Y), the dye (M), and the phthalocyanine dye (C), respectively. This allows the water-based inks of the respective colors to have light resistances substantially equivalent to that of the water-based black ink. Thus, with the use of such an ink set, it is possible to form images whose color balance changes little even if the colors are faded. The same applies to the water-based light yellow ink, water-based light magenta ink, and water-based light cyan ink with low dye concentrations. In the water-based light black ink, the dye (Y), the dye (M), and the phthalocyanine dye (C) may be blended so as to satisfy the conditions (a) and (b).

Next, the ink cartridge is explained. As described above, the ink cartridge comprises the water-based black ink for ink-jet recording. As a body of the ink cartridge, for example, a conventionally known body may be used.

Next, the ink-jet recording apparatus is explained. The ink-jet recording apparatus comprises an ink storing portion and an ink ejecting unit, and an ink stored in the ink storing portion is ejected by the ink ejecting unit. The ink cartridge is stored in the ink storing portion. Other than this, the ink-jet recording apparatus may have a structure similar to that of a conventionally known ink-jet recording apparatus, for example.

FIG. 1 shows a structure of an example of the ink-jet recording apparatus. As shown in FIG. 1, the ink-jet recording apparatus 1 comprises four ink cartridges 2, an ink ejecting unit (ink-jet head) 3, a head unit 4, a carriage 5, a drive unit 6, a platen roller 7, and a purge device 8 as main components.

The four ink cartridges 2 comprise water-based inks of four colors, namely, yellow, magenta, cyan, and black, respectively. For example, the ink cartridge comprising the water-based black ink is the above-described ink cartridge. The ink-jet head 3 performs recording on a recording medium P such as a recording paper. The head unit 4 is provided with the ink jet head 3. The four ink cartridges 2 and the head unit 4 are mounted on the carriage 5. The drive unit 6 reciprocates the carriage 5 in a straight line. A conventionally known drive unit (for example, JP2008-246821) may be used as the drive unit 6. The platen roller 7 extends in a reciprocating direction of the carriage 5 and opposes to the ink-jet head 3. The recording includes recording of letters, images; printing; and the like.

The recording medium P is fed from a paper feeding cassette (not shown) positioned on a side of or underneath the ink-jet recording apparatus 1. The recording medium P is introduced between the ink-jet head 3 and the platen roller 7. Then, predetermined recording is performed on the recording medium P with the ink ejected from the ink-jet head 3. The recording medium P then is discharged from the ink-jet recording apparatus 1. In FIG. 1, a feeding mechanism and a discharging mechanism of the recording medium P are not shown.

The purge unit 8 draws poor ink containing, for example, air bubbles trapped inside the ink-jet head 3. A conventionally known purge unit (for example, JP2008-246821) may be used as the purge unit 8.

At the platen roller 7 side of the purge unit 8, a wiper member 20 is provided adjacent to the purge unit 8. The wiper member 20 has a spatula shape, and wipes a nozzle-formed surface of the ink-jet head 3 in accordance with the movement of the carriage 5. In FIG. 1, the cap 18 covers the plural nozzles of the ink-jet head 3, which return to the reset position after the completion of recording in order to prevent the ink from drying.

In the ink-jet recording apparatus, the four ink cartridges may be mounted to plural carriages. Alternatively, the four ink cartridges may not be mounted to the carriage, but may be provided and fixed in the ink-jet recording apparatus. In this state, for example, the ink cartridges and the head unit mounted to the carriage are connected via a tube, or the like, and the ink is supplied to the head unit from the ink cartridge.

EXAMPLES

Examples of the present invention are described together with Comparative Examples, which are provided for illustrative purposes only. The present invention is not limited by the following Examples and Comparative Examples.

Examples 1 to 5 and Comparative Examples 1 to 7

Water-based black inks for ink-jet recording according to Examples 1 to 5 and Comparative Examples 1 to 7 were obtained by mixing their ink components (Table 1) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In Table 1 below, yellow dyes (1-A) and (1-B) are compounds represented by the structural formulae (1-A) and (1-B), respectively, magenta dyes (2-A) and (2-B) are compounds represented by the structural formulae (2-A) and (2-B), respectively, and cyan dyes (3-A) to (3-C) are compounds represented by the structural formulae (3-A) to (3-C), respectively.

With respect to each of the water-based black inks of the examples and comparative examples, (i) evaluation of light resistance, (ii) evaluation of hue, and (iii) comprehensive evaluation were made according to the following methods. Samples used for (i) evaluation of light resistance and (ii) evaluation of hue were prepared in the following manner.

First, ink cartridges were filled with the water-based black inks of the examples and the comparative examples, respectively. Next, each of the ink cartridges was attached to an ink-jet printer mounted digital multi-function center DCP-350C manufactured by Brother Industries, Ltd. Then, a gradation sample of the water-based black ink was printed on a glossy photo paper BP61GLA manufactured by Brother Industries, Ltd., and an evaluation patch having an initial OD value of 0.5 was thereby obtained. The OD value was measured with a spectrophotometer, Spectrolino (light source: $D_{65}$; observer: 2°; and status A), manufactured by Gretag-Macbeth.

(i) Evaluation of Light Resistance

Using a super xenon weather meter, SC750-WN, manufactured by SUGA TEST INSTRUMENTS CO., LTD, the gradation sample was irradiated with light from a xenon lamp for 100 hours under the conditions that the temperature in the bath was 25° C., the relative humidity in the bath was 50%, and the illuminance was 93 klx. Next, the OD vale of the evaluation patch after irradiation was measured in the same manner as described above. Then, the OD value decrease rate (%) was determined according to the following equation (I), and the light resistance was evaluated according to the following evaluation criteria. The smaller the OD value decrease rate, the less the deterioration in image quality, which means the light resistance of the water-based ink is higher.

$$\text{OD value decrease rate (\%)} = \{(X-Y)/X\} \times 100 \quad \text{(I)}$$

X: 0.5 (initial OD value)
Y: OD value after irradiation
Evaluation Criteria for Evaluation of Light Resistance
G: OD value decrease rate was less than 10%, and there was no problem in practical use
NG: OD value decrease rate was 10% or more, and there was a problem in practical use
(ii) Evaluation of Hue
The chroma C* of the evaluation patch was measured with a spectrophotometer, Spectrolino (light source: $D_{65}$; observer: 2°; status A) manufactured by Gretag Macbeth, and the hue was evaluated according to the following evaluation criteria.
Evaluation Criteria for Evaluation of Hue
G: chroma C was 15 or less, and achromatic colors could be expressed sufficiently.
NG: chroma C* was more than 15, and achromatic colors could not be expressed sufficiently.
(iii) Comprehensive Evaluation
With respect to the water-based black inks of the examples and the comparative examples, comprehensive evaluation was made according to the following evaluation criteria based on the results of the evaluations (i) and (ii).
Evaluation Criteria for Comprehensive Evaluation
G: The results of both the evaluations (i) and (ii) were G.
NG: The result of one of the evaluations (i) and (ii) was NG.
The ink compositions and the results of evaluations of the inks according to the examples and the comparative examples are summarized in Table 1.

As summarized in Table 1, the water-based black inks of Example 1 to 5 showed favorable results in both the light resistance evaluation and the hue evaluation. In contrast, the water-based black ink of Comparative Example 1, in which (Y+M):C=1:2 and the condition (b) was not satisfied, showed an inferior result in the hue evaluation. Similarly, the water-based black ink of Comparative Example 2, in which (Y+M):C=3:1 and the condition (b) was not satisfied, showed an inferior result in the hue evaluation. Furthermore, the water-based black ink of Comparative Example 3, in which Y:M=1:2 and the condition (a) was not satisfied, showed an inferior result in the hue evaluation. Similarly, the water-based black ink of Comparative Example 4, in which Y:M=2:1 and the condition (a) was not satisfied, showed an inferior result in the hue evaluation. Still further, the water-based black ink of Comparative Example 5, in which the dye (Y), the dye (M), and the dye (C) were not used and C. I. Food Black 2 was used, showed an inferior result in the light resistance evaluation. Still further, the water-based black ink of Comparative Example 6, in which the dye (Y) was not used and C. I. Acid Yellow 23 was used, showed an inferior result in the light resistance evaluation. Similarly, the water-based black ink of Comparative Example 7, in which the dye (M) was not used and C. I. Acid Red 289 was used, showed an inferior result in the light resistance evaluation.

It will be obvious to those having skill in the art that many changes may be made in the above-described details of the particular aspects described herein without departing from the spirit or scope of the invention as defined in the appended claims.

TABLE 1

| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| Ink composition (wt %) | Yellow dye (1-A) | 0.375 | — | 1.00 | — | 1.80 | — | 2.25 | — | 2.00 | — | — | — |
| | Yellow dye (1-B) | — | 1.00 | — | 1.91 | — | 0.50 | — | 1.50 | — | — | — | 1.80 |
| | C.I. Acid Yellow 23 | — | — | — | — | — | — | — | — | — | — | 1.50 | — |
| | Magenta dye (2-A) | 0.375 | — | 1.00 | — | — | 0.50 | — | 3.00 | 1.00 | — | — | — |
| | Magenta dye (2-B) | — | 1.00 | — | 1.27 | 2.70 | — | 2.25 | — | — | — | 1.50 | — |
| | C.I. Acid Red 289 | — | — | — | — | — | — | — | — | — | — | — | 1.20 |
| | Cyan dye (3-A) | 0.75 | — | — | — | — | — | — | 4.50 | — | — | — | — |
| | Cyan dye (3-B) | — | — | 3.00 | — | — | — | 1.50 | — | — | — | — | 3.00 |
| | Cyan dye (3-C) | — | — | — | — | 4.50 | — | — | — | — | — | 3.00 | — |
| | C.I. Direct Blue 199 | — | 1.00 | — | 3.82 | — | 2.00 | — | — | 3.00 | — | — | — |
| | C.I. Food Black 2 | — | — | — | — | — | — | — | — | — | 6.00 | — | — |
| | Glycerin | 14.5 | 14.5 | 14.5 | 14.5 | 14.5 | 14.5 | 14.5 | 14.5 | 14.5 | 14.5 | 14.5 | 14.5 |
| | Triethylene glycol n-butyl ether | 5.0 | 5.0 | 5.0 | 5.0 | 5.0 | 5.0 | 5.0 | 5.0 | 5.0 | 5.0 | 5.0 | 5.0 |
| | SUNNOL ® NL1430 (*1) | 0.5 | 0.5 | 0.5 | 0.5 | 0.5 | 0.5 | 0.5 | 0.5 | 0.5 | 0.5 | 0.5 | 0.5 |
| | Water | balance | balance | balance | balance | balance | balance | balance | balance | balance | balance | balance | balance |
| (*2) | | 1.5 | 3.0 | 5.0 | 7.0 | 9.0 | 3.0 | 6.0 | 9.0 | 6.0 | 6.0 | 6.0 | 6.0 |
| (*3) | Y:M | 1:1 | 1:1 | 1:1 | 3:2 | 2:3 | 1:1 | 1:1 | 1:2 | 2:1 | — | 1:1 | 3:2 |
| | (Y+M):C | 1:1 | 2:1 | 2:3 | 5:6 | 1:1 | 1:2 | 3:1 | 1:1 | 1:1 | — | 1:1 | 1:1 |
| Evaluation | Light resistance | OD value decrease rate | 3.8% | 3.8% | 4.2% | 2.1% | 2.3% | 4.0% | 4.2% | 3.5% | 3.8% | 14.8% | 13.5% | 14.0% |
| | | Evaluation | G | G | G | G | G | G | G | G | G | NG | NG | NG |
| | Hue | C* | 7.3 | 1.1 | 11.5 | 12.2 | 10.3 | 20.9 | 16.6 | 16.7 | 18.8 | 7.0 | 7.5 | 14.5 |
| | | Evaluation | G | G | G | G | G | NG | NG | NG | NG | G | G | G |
| | Comprehensive evaluation | | G | G | G | G | G | NG | NG | NG | NG | NG | NG | NG |

(*1): polyoxyethylene (3E.O.) alkyl (C = 12, 13) ether sodium sulfate, manufactured by Lion Corporation, active ingredient amount = 28 wt %,
(*2): Solid content of coloring agent (wt %),
(*3): Mixing ratio of dyes in coloring agent (ratio by weight)

What is claimed is:

1. A water-based black ink for ink jet recording, comprising:
a coloring agent; and
water,
wherein the coloring agent comprises a yellow dye, a magenta dye, and a cyan dye, the yellow dye comprises a dye (Y) represented by the following general formula (1), the magenta dye comprises a dye (M) represented by the following general formula (2),
the cyan dye comprises at least one dye (C) selected from the group consisting of a compound represented by the structural formula (3-A), a compound represented by the structural formula (3-B), a compound represented by the structural formula (3-C), C.I. Direct Blue 199, C.I. Direct Blue 86, and C.I. Direct Blue 307, and
the dye (Y), the dye (M), and the dye (C) are blended so as to satisfy the following conditions (a) and (b):
(a) Y:M (weight ratio)=about 2:3 to about 3:2
(b) (Y+M):C (weight ratio)=about 2:1 to about 2:3

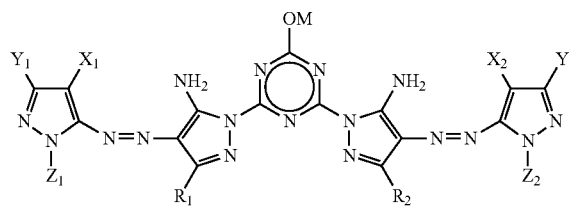
(1)

wherein in the general formula (1),
$R_1$, $R_2$, $Y_1$, and $Y_2$ each represent a monovalent group, and $R_1$, $R_2$, $Y_1$, and $Y_2$ may be the same or different;
$X_1$ and $X_2$ each represent an electron attractive group, and $X_1$ and $X_2$ may be the same or different;
$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and $Z_1$ and $Z_2$ may be the same or different; and
M represents a hydrogen atom or a cation,

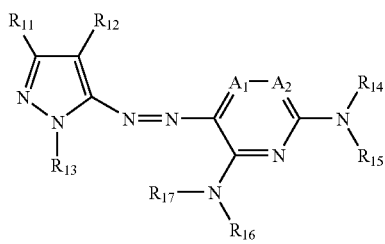
(2)

wherein in the general formula (2),
$R_{11}$ represents a hydrogen atom, a substituted or unsubstituted alkyl group, or a substituted or unsubstituted aryl group;
$R_{12}$ represents a hydrogen atom, a halogen atom, or a cyano group;
$R_{13}$ represents a hydrogen atom, a substituted or unsubstituted alkyl group, a substituted or unsubstituted aryl group, or a substituted or unsubstituted heterocyclic group;
$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and $R_{14}$, $R_{15}$, $R_{16}$, and $R_{17}$ may be the same or different, provided that $R_{14}$ and $R_{15}$ are not both hydrogen atoms, and that $R_{16}$ and $R_{17}$ are not both hydrogen atoms; and
$A_1$ and $A_2$ are both substituted or unsubstituted carbon atoms, or one of $A_1$ and $A_2$ is a substituted or unsubstituted carbon atom and the other is a nitrogen atom,

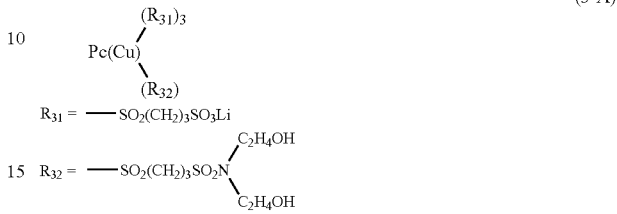
(3-A)

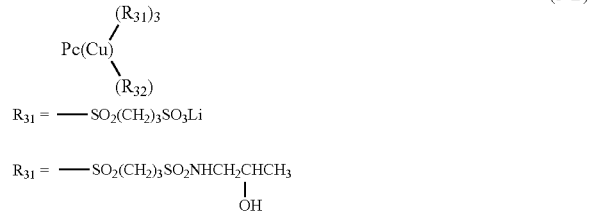
(3-B)

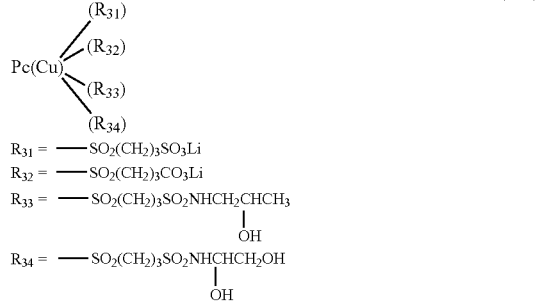
(3-C)

wherein in the structural formulae (3-A), (3-B) and (3-C),
Pc(Cu) represents a copper phthalocyanine nucleus represented by the general formula (Pc)

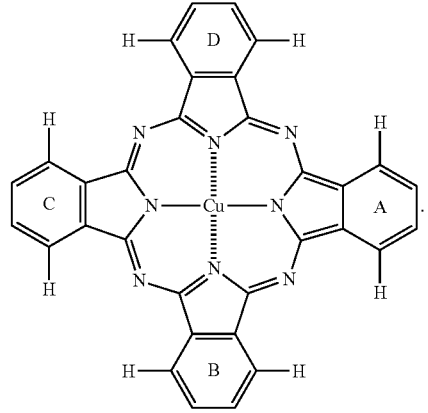
(Pc)

2. The water-based black ink for ink jet recording according to claim 1, wherein the phthalocyanine dye (C) comprises at least one dye selected from the group consisting of C.I. Direct Blue 199, C.I. Direct Blue 86, and C.I. Direct Blue 307.

3. An ink cartridge comprising a water-based black ink for ink jet recording, wherein the ink is the water-based black ink for ink jet recording according to claim 1.

4. An ink jet recording apparatus comprising:
an ink storing portion; and
an ink ejecting unit, an ink stored in the ink storing portion being ejected by the ink ejecting unit, wherein the ink cartridge according to claim 3 is stored in the ink storing portion.

5. The water-based black ink for ink jet recording according to claim 1, wherein
the dye (Y) represented by the general formula (1) comprises at least one of a compound represented by the structural formula (1-A) and a compound represented by the structural formula (1-B), and
the dye (M) represented by the general formula (2) comprises at least one of a compound represented by the structural formula (2-A) and a compound represented by structural formula (2-B)

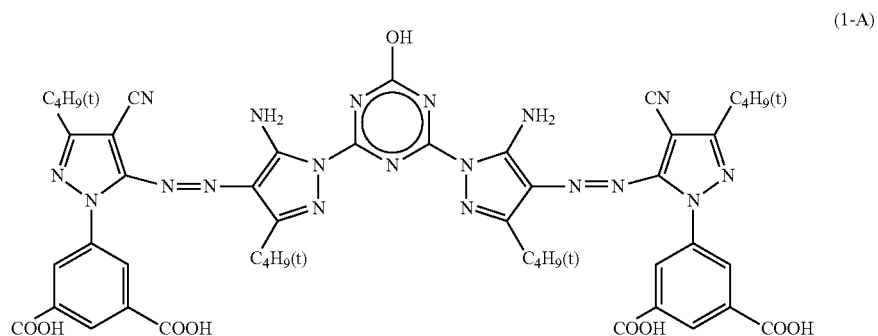
(1-A)

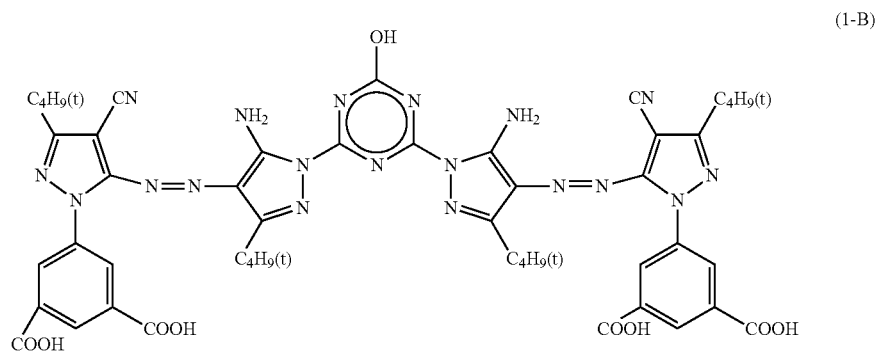
(1-B)

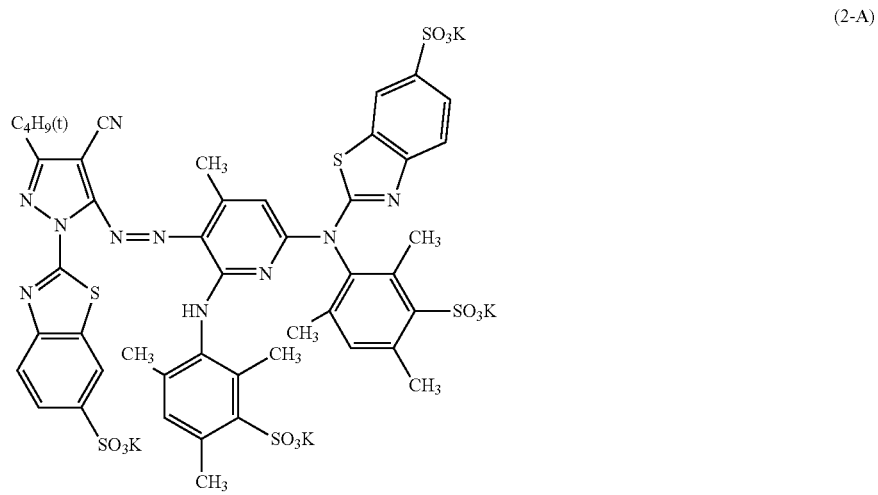
(2-A)

-continued
(2-B)
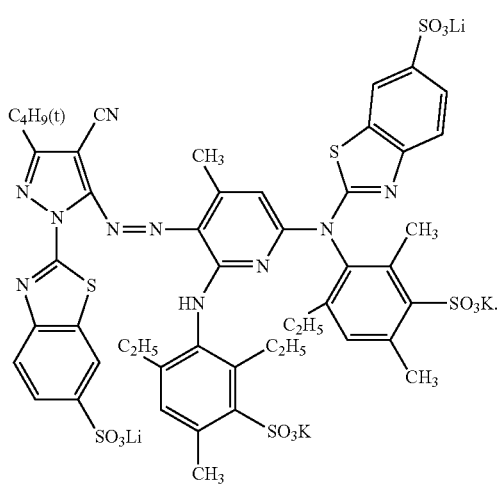
* * * * *